United States Patent [19]
Schindler

[11] Patent Number: 5,713,564
[45] Date of Patent: Feb. 3, 1998

[54] SUPPORT DEVICE

[75] Inventor: Reinhard Schindler, Kronau, Germany

[73] Assignee: Heidelberger Druckmaschinen AG, Heidelberg, Germany

[21] Appl. No.: 627,969

[22] Filed: Apr. 4, 1996

[30] Foreign Application Priority Data

Apr. 5, 1995 [DE] Germany ............... 195 12 664.5

[51] Int. Cl.⁶ .................................................. B23Q 3/02
[52] U.S. Cl. ............................. 269/310; 269/309
[58] Field of Search .................... 269/20, 22, 309, 269/310, 315, 316, 317; 279/4.06, 4.11, 4.12, 5, 138

[56] References Cited

U.S. PATENT DOCUMENTS

| 2,338,603 | 1/1944 | Schultz. | |
|---|---|---|---|
| 3,421,750 | 1/1969 | Tridgell | 269/20 |
| 3,729,185 | 4/1973 | Roeske. | |
| 3,792,855 | 2/1974 | Bondie | 269/310 |
| 3,904,214 | 9/1975 | Manchester | 279/4.11 |
| 3,938,798 | 2/1976 | Solie et al. . | |
| 4,386,544 | 6/1983 | Fuminier | 279/4.06 |
| 4,396,186 | 8/1983 | Solie et al. | 269/310 |
| 4,909,493 | 3/1990 | Yonezawa | 269/309 |

FOREIGN PATENT DOCUMENTS

1357184  12/1987  U.S.S.R. ........................ 269/20

*Primary Examiner*—Robert C. Watson
*Attorney, Agent, or Firm*—Herbert L. Lerner; Laurence A. Greenberg

[57] ABSTRACT

Support device having a support shaft and a housing formed with guide surface sections form-lockingly surrounding the support shaft, the support shaft being guidable rectilinearly in a longitudinal direction thereof along the guide surface sections, includes a chucking device supported by the housing, the chucking device serving for converting a therewith engageable adjusting force into a pressing force between at least one part of the guide surface sections and the support shaft, the chucking device being formed as a force-transmitting device which increases the effect of the adjusting force.

12 Claims, 6 Drawing Sheets

SUPPORT DEVICE

BACKGROUND OF THE INVENTION

Field of the Invention

The invention relates to a support device having a support shaft and a housing formed with guide surface sections therein form-lockingly surrounding the support shaft, the support shaft being guidable rectilinearly in a longitudinal direction thereof along the guide surface sections, and a chucking device supported by the housing, the chucking device serving for converting a therewith engageable adjusting force into a pressing force between at least one part of the guide surface sections and the support shaft. With regard to the foregoing, it is noted that a form-locking connection connects two elements together due to the shape of the elements themselves, as opposed to a force-locking connection, which locks the elements together by force external to the elements.

Such support devices serve, for example, for statically oversized supports of a workpiece clamped in a machine tool to counter cutting forces and, if necessary or desirable, to avoid vibration of the workpiece under the influence of these cutting forces.

In a commercially available support device of this type, the support shaft is surrounded over part of the length thereof by an elastic sleeve fixedly disposed in the housing. A chamber upon which a pressure fluid is actuatable is provided between the sleeve and the housing. Pressure prevailing in this chamber causes the sleeve to press against the circumference of the support shaft, so that this shaft is firmly clamped in the housing in a position displaced in the longitudinal direction of the support shaft.

To attain sufficiently high support forces, such heretofore known support devices require a pressure of up to $400 \times 10^3$ hPa. To place the pressure fluid under such high pressure, pressure boosters are employed in practical use. This is accompanied by disadvantages, especially in view of investment costs. The support device itself, however, must be adapted to the aforementioned high pressure by being designed with suitably large dimensions. This necessarily also means that a considerable amount of space is required to accommodate- the conventional, i.e., heretofore known, support device in a tool chucking device.

SUMMARY OF THE INVENTION

It is accordingly an object of the invention, to provide a support device of the foregoing general type with which high support forces can be attained for relatively little space requirement.

With the foregoing and other objects in view, there is provided, in accordance with the invention, a support device having a support shaft and a housing formed with guide surface sections therein which form-lockingly surrounding the support shaft, the support shaft being guidable rectilinearly in a longitudinal direction thereof along the guide surface sections, comprising a chucking device supported by the housing, the chucking device serving for converting a therewith engageable adjusting force into a pressing force between at least one part of the guide surface sections and the support shaft, the chucking device being formed as a force-transmitting device which increases the effect of the adjusting force.

In accordance with another feature of the invention, the support shaft is formed with at least one longitudinally extending portion thereof having a cross-sectional profile other than circular, the chucking device, when engaged by the adjusting force, being actionable for exerting a torsional force on the support shaft.

In accordance with a further feature of the invention, the chucking device, when engaged by the adjusting force, is actionable for exerting a transverse force on the support shaft.

In accordance with an added feature of the invention, the support device includes a chamber formed in the housing and interrupting the guide surface sections, the chucking device being received in the chamber.

In accordance with an additional feature of the invention, the support device includes a control element arrangement disposed in the housing, the chucking device being engageable by the adjusting force via the control element arrangement.

In accordance with yet another feature of the invention, the control element arrangement includes at least one working piston having a pressurized fluid acting thereon, and a cylinder integrated in the housing and guiding the working piston, the working piston, during operation, being positioned against the chucking device under the pressure of the fluid.

In accordance with an alternative feature of the invention, the control element arrangement is formed as a set screw received in a thread formed in the housing and, during operation, being positioned against the chucking device.

In accordance with yet a further feature of the invention, the chucking device is formed by a lever acting transversely to the support shaft, the lever having a first end part at which, during operation, the lever is acted upon by the adjusting force.

In accordance with yet an added feature of the invention, the support shaft is formed with at least one longitudinally extending portion thereof having an other than circular cross-sectional profile, and wherein the lever is formed with a recess on a second end portion thereof located opposite the first end portion thereof, the recess being defined by a surface matching the other than circular cross-sectional profile of the support shaft and being in engagement like a wrench with the support shaft at a location of the longitudinally extending portion thereof having the other than circular cross-sectional profile.

In accordance with yet an additional feature of the invention, the support device includes an articulated connection between the housing and a second end portion of the lever disposed opposite the first end portion thereof, the lever being in engagement with the support shaft between the first end portion of the lever and the articulated connection.

In accordance with still another feature of the invention, the support device includes a displacement device integrated in the housing, the displacement device having a positioning spring braced against the housing and engaging the support shaft for longitudinally displacing the support shaft from a starting position thereof, and having a switching device resettable by a pressurized fluid from a non-activated state, wherein the support shaft is maintained in the starting position thereof counter to the action of the positioning spring, into an activated state, wherein a displacement of the support shaft out of the starting position thereof is enabled.

In accordance with a concomitant feature of the invention, the switching device comprises an adjusting piston guided in longitudinal direction of the support shaft in the housing and formed with a bore through which the support shaft extends, a stop disposed on the support shaft, the adjusting piston being positionable against the stop, and a restoring spring engaging the adjusting piston and being braced against the housing, the adjusting piston being positioned against the stop under the force of the restoring spring in the non-activated state of the switching device, the adjusting piston, when acted upon at one side thereof by the pressurized fluid, being displaceable counter to the force of the restoring spring.

In the device according to the invention, the support force attainable therewith is indeed, as in the aforementioned heretofore known support device, in the form of a frictional force which, during operation, counteracts a longitudinal displacement of the support shaft, however, in order to generate a frictional force of a magnitude like that in the heretofore known support device, it requires a considerably lesser adjusting force. This reduction in the adjusting force required to attain a specific support force is achieved, in accordance with the invention, by the fact that the pressing force which is definitive for the aforementioned frictional force is increased relative to the adjusting force by means of the force-reinforcing chucking device between at least some of the guide surface sections and the support shaft. In contrast therewith, the aforementioned positioning force in the conventional support device is reduced with respect to the adjusting force employed for generating it, specifically by the amount of a restoring force on the part of the elastic - sleeve which acts counter to the adjusting force.

A preferred construction of the device according to the invention is distinguished by the fact that the support shaft, along at least one support shaft portion thereof guided on the guide surface sections, has a cross-sectional profile which is other than circular, and that the chucking device, under the influence of the adjusting force which engages it, exerts a torsional force on the support shaft. In this case, the positioning force between at least some of the guide surface sections and at least one portion of the support shaft results from the support shaft being locked against rotation relative to the guide surface sections occurring along the longitudinal axis of the support shaft, the locking being effected due to the cross-sectional profile thereof which, at least in some portions, differs from a circular area profile and due to the form-locking embedding of this cross-sectional profile into the guide surface sections, which are, at least intermittently, equipped with a corresponding profile. The torsional force exerted on the support shaft thus directly produces the positioning force which is definitive for the attainable support force.

Another preferred embodiment is distinguished in that the chucking device, under the influence of the adjusting force engaging it, exerts a transverse force on the support shaft. The cross-sectional form of the support shaft or of the guide surface sections provided for rectilinear guidance of the support shaft can correspond, in the simplest case without exception, to a circular area or a circular-cylindrical recess formed in the housing.

In a further preferred embodiment, there is provided a chamber formed in the housing and interrupting the guide surface sections, the chucking device being received in this chamber. In this feature, the conversion of the adjusting force engaging the chucking device into the aforementioned positioning force is effected via an engagement of the chucking device with the support shaft, which occurs within the housing.

In yet another preferred construction, by means of an ultimate or final control element arrangement, which is received in the housing, the chucking device can be acted upon by the adjusting force. A first variation or alternative thereof is distinguished in that the ultimate or final control element arrangement includes at least one work piston that can be acted upon by a fluid under pressure, and one cylinder integrated into the housing and guiding the work piston, the work piston being positioned, during operation, against the chucking device under the pressure of the fluid. A second variation or alternative construction is that the final or ultimate control element arrangement is formed as a set screw received in a thread formed in the housing, the set screw being positioned against the chucking device, during operation.

In an additional preferred embodiment, the chucking device is formed by means of a lever acting transversely to the support shaft, the lever being acted upon by the adjusting force, at a first end portion thereof, during operation. The chucking device formed by a lever in this manner, is distinguished in combination with the construction described hereinbefore, wherein the chucking device, under the influence of the adjusting force engaging it, exerts a torsional force on the support shaft, and wherein a recess is formed on a second end portion of the lever opposite the first end portion thereof, the recess being adapted to or matching the other than circular cross-sectional profile of the support shaft and having defining surfaces in engagement with the support shaft in the manner of a wrench inside the at least one support shaft portion having this cross-sectional profile.

The support device equipped with a chucking device formed by a lever acting transversely to the support shaft is distinguished, in a further preferred embodiment, in that an articulated connection is provided between the housing and a second end portion of the lever opposite the first end portion thereof, and the lever is in engagement with the support shaft between this first end portion and the articulated connection.

A further development of the support device, which is advantageous particularly with a view to an automatic longitudinal displacement of the support shaft into a support position thereof, preferably includes a displacement device integrated in the housing and having a positioning spring braced against the housing and engaging the support shaft, the positioning spring being effective for producing a longitudinal displacement of the support shaft from a starting position thereof, and a switching device changeable, by a pressurized fluid, from a non-activated state, wherein the support shaft is maintained in the starting position thereof counter to the action of the positioning spring, to an activated state, wherein the displacement of the support shaft out of the starting position thereof is enabled.

An additional preferred embodiment is distinguished by providing that the switching device include an adjusting piston guided in the longitudinal direction of the support shaft in the housing and penetrated by the support shaft, a stop provided on the support shaft, the adjusting piston being positionable against the stop, and a restoring spring engaging the adjusting piston and braced against the housing, the restoring spring having a spring force by which the adjusting piston is positioned against the stop in the non-activated state of the switching device, and the adjusting piston, acted upon at one end thereof by the pressurized fluid, being displaceable counter to the spring force of the restoring spring.

Other features which are considered as characteristic for the invention are set forth in the appended claims.

Although the invention is illustrated and described herein as embodied in a support device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
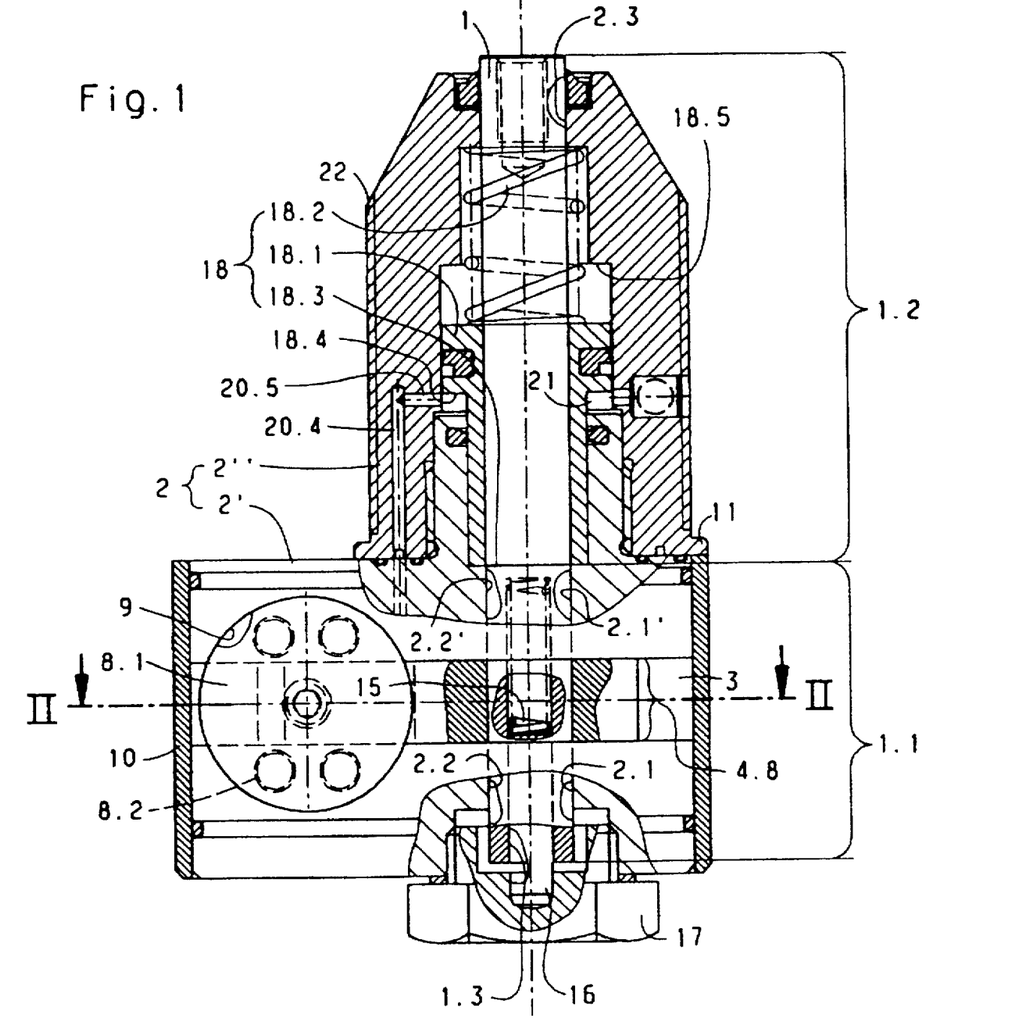
FIG. 1 is a front elevational view, partly in section and partly broken away, of an exemplary embodiment of the support device according to the invention, with a support shaft which is under the influence of a torsional force during operation.
Figure 2:
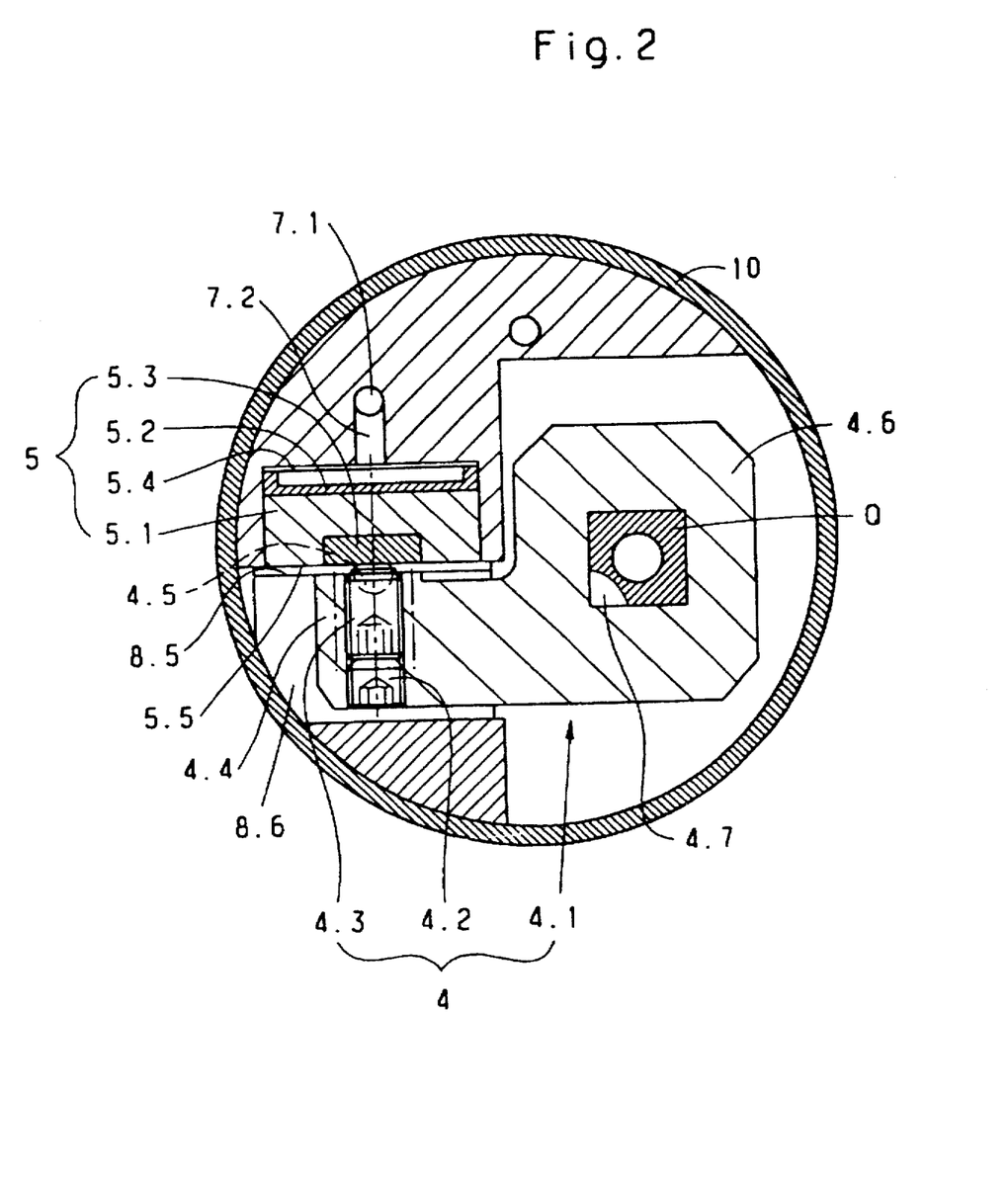
FIG. 2 is a cross-sectional view of FIG. 1 taken along the line II—II in the direction of the arrows.

Referring now to the figures of the drawings and, first, particularly to FIGS. 1 and 2 thereof, there is shown therein a support shaft 1 received, longitudinally displaceably, in a housing 2 which, in the embodiment of FIGS. 1 and 2, is formed of a lower housing part 2' and an upper housing part 2". The upper housing part 2", in this embodiment, takes the form of a sleeve which is screwed, via an internal thread formed thereon, to an externally threaded extension of the lower housing part 2'. In a construction wherein the support shaft 1 is under the influence of a torsional force during operation, the support shaft 1 has a cross-sectional profile Q which is other than circular and, in the embodiment of FIGS. 1 and 2, is in the form of a quadrilateral profile, on a first support shaft portion 1.1 located in the lower part 2' of the housing in this embodiment.

Guide surface sections 2.1, 2.2 and 2.1', 2.2' are provided in the lower housing part 2'; they form-lockingly surround the cross-sectional profile Q, which is formed as a quadrilateral profile, along the length of the support shaft section 1.1 and the support shaft 1 is guided rectilinearly thereon in the longitudinal direction thereof. The guide surface sections 2.1, 2.2 and 2.1', 2.2', partly exposed in FIG. 1 by breaking away the support shaft 1, represent only two, respectively, of a total of four paired oppositely disposed guide surface sections, which conform to the cross-sectional profile Q in the form of the aforementioned quadrilateral profile of square cross section. Adjacent to this quadrilateral profile, the support shaft 1, in the embodiment of FIGS. 1 and 2, has a second support shaft portion 1.2 with a circular-cylindrical cross section, which has a diameter matching the length of a side of the square quadrilateral profile, so that, on the mutually facing ends of the two support shaft sections 1.1 and 1.2, corners of the quadrilateral profile protrude beyond the circular-cylindrical cross section. These corners form a stop, which is discussed in greater detail hereinafter.

A further guide surface section 2.3 is provided on a portion of the sleeve-like upper housing part 2"; this section 2.3 conforms to what, in this embodiment, is the circular-cylindrical cross section of the support shaft 1. The construction of a circular-cylindrical cross section in the region of the guide surface section 2.3 is not compulsory. In principal, here as well, an other-than-circular cross section of the support shaft 1 and a corresponding cross section for the guide surface section 2.3 are possible.

In the longitudinal direction of the support shaft 1, a chamber 3 formed in the housing 2, in this case in the lower part 2', adjoins first guide surface sections 2.1 and 2.2 of the guide surface sections 2.1, 2.2, 2.1', 2.2', and these first guide surface sections 2.1 and 2.2 are followed by second guide surface sections 2.1' and 2.2'. The guide surface sections 2.1, 2.1', 2.2, 2.2' are thus interrupted by the chamber 3. A chucking device 4, which includes a lever 4.1 acting transversely to the support shaft, is received in the chamber 3. A pressure screw 4.3 is screwed into a first end portion 4.4 of the lever 4.1, in a direction extending crosswise to the longitudinal direction of the support shaft 1, and is fixed by means of a check screw 4.2 in a position wherein one end of the pressure screw 4.3 protrudes past the contour of the lever 4.1. At this end of the pressure screw 4.3, a ball 4.5 provided with a flattened surface is mortised into the pressure screw and, in turn, protrudes beyond the pressure screw 4.3; the ball 4.5 serves for introducing an adjusting force acting upon the lever 4.1. A recess 4.7 (note FIG. 2) is formed in the second end portion 4.6 of the lever 4.1 opposite the first end portion 4.4 thereof.

As noted hereinbefore, the support shaft 1 in the embodiment of FIGS. 1 and 2 is provided, in the region of the chamber 3 receiving the lever 4.1, with a cross-sectional profile Q formed as a quadrilateral profile and, in that sense, is other than circular. The aforementioned recess 4.7 is adapted to or matches this cross-sectional profile Q; that is, it encloses this cross-sectional profile Q in the manner of a wrench and is thus in engagement with the support shaft 1. A first support of the chucking device 4 via the lever 4.1 thereof on the housing 2 is consequently attained therewith.

An ultimate control element arrangement 5 is also disposed in the housing 2 and, by means thereof, the chucking device 4, which surrounds the lever 4.1 in this embodiment, can be acted upon by the aforementioned adjusting force. In the exemplary embodiments of FIGS. 1 to 4, the ultimate control element arrangement 5 includes a work piston 5.1 which can be acted upon by a fluid under pressure. This piston is guided in a cylinder 5.4 integrated with the housing 2 so that a first end face 5.5 of the work piston 5.1 is directly opposite the aforementioned ball 4.5. An end of the work piston 5.1 distal from the first end face 5.5 thereof is adjoined by a diaphragm seal 5.2, by means of which the work piston 5.1 is sealed off from the cylinder 5.4. A pressure plate or thrust member 5.3 is embedded in the first end face 5.5 of the work piston 5.1 and, during operation, rests on the aforementioned flattened surface of the ball 4.5. This produces a second support of the chucking device 4 via the lever 4.1 thereof on the housing 2. Due to the pressure member 5.3, a relatively soft material, such as brass, for example, can be used for the work piston 5.1.

Figure 3:
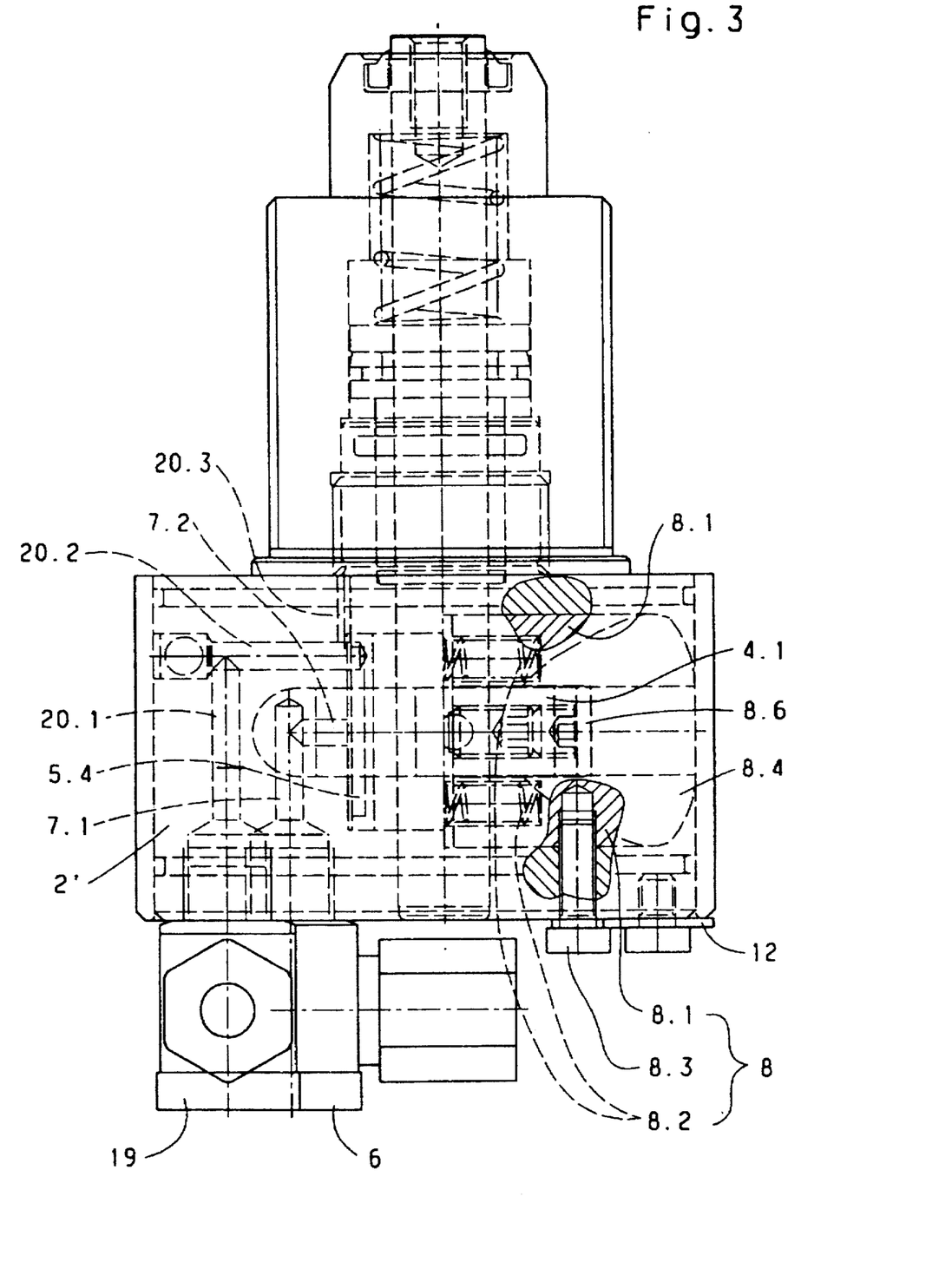
FIG. 3 is a side elevational view, partly broken away, of FIG. 1.

For applying the pressurized fluid to the work piston 5.1, a screw coupling or union 6 shown diagrammatically in FIG.

3 is inserted into the lower housing part 2'; the union 6 may communicate, on the one hand, with a non-illustrated source of pressurized fluid which supplies the work piston 5.1 with the pressurized fluid and, on the other hand, with communicating bores 7.1 and 7.2, one of which discharges into the cylinder 5.4, at an end face of this cylinder directly opposite the diaphragm seal 5.2. When the cylinder 5.4 is connected during operation with the aforementioned pressure fluid source, the work piston 5.1 is thus positioned against the chucking device 4. The pressure member 5.3 presses with the aforementioned adjusting force against the flattened surface of the ball 4.5 and generates a torque at the lever 4.1 relative to the longitudinal axis of the support shaft 1 which is form-lockingly disposed in the recess 4.7 of the lever 4.1. As a result of the wrench-like engagement between the lever 4.1 and the support shaft 1, a torsional force is exerted upon the support shaft 1 and, because of the ratios of the lever arms at the lever 4.1, is many times larger than the adjusting force. The chucking device 4 is thus constructed in the form of a force booster or a power ratio device which increases the effect of the adjusting force.

The aforementioned torsional force in the support shaft portion 1.1 presses the side surfaces of the support shaft 1, which is provided with the aforementioned quadrilateral profile in this embodiment, against the aforementioned four pairs of opposed guide surface sections, of which the guide surface sections 2.1, 2.2 and 2.1', 2.2' can be seen in FIG. 1. By means of the chucking device 4, there thus results a conversion of the adjusting force into a positioning force between the aforementioned guide surface sections and the support shaft 1. In the aforedescribed exemplary embodiment, the guide surface section 2.3 is not subject to a positioning force on the part of the support shaft 1, because the latter, in the region of this guide surface section 2.3, has a circular-cylindrical cross section and thus does not transmit any torsional moment or torque.

The final result of the aforementioned positioning force is the support force in the longitudinal direction of the support shaft 1, which is attainable with the support device. The support force is discontinued by relieving the pressure of the cylinder 5.4 in a conventional manner, a consequence of which is that the work piston 5.1, under the influence of a restoring device 8, draws away from the ball 4.5, which is otherwise centrally disposed with respect to the first end face 5.5 of the work piston 5.1 and with respect to the thickness 4.8 of the lever 4.1, measured in the longitudinal direction of the support shaft 1. The restoring device 8 includes a support element 8.1 inserted into the lower housing part 2', compression springs 8.2 supported in the support element 8.1, and a fixing screw 8.3 which retains the support element 8.1 in the lower housing part 2'. The support element 8.1 has a circular-cylindrical jacket surface, which is press-fitted into a transverse bore 9, aligned with the work piston 5.1, in the lower housing part 2' which, in turn, has the shape of a substantially circular-cylindrical prism. A first end face 8.4 of the support element 8.1 is adapted to or matches the external shape of the lower housing part 2'. A slit 8.6 extends from an opposing flat second end face 8.5 of the support element 8.1 and constitutes a component of the aforementioned chamber 3 formed in the housing 2 and surrounds the lever 4.1 in the region of the first end portion 4.4 thereof. The compression springs 8.2 are embedded in the support element 8.1 from the second end face 8.5, on both sides of the slit 8.6, and act upon the first end face 5.5 of the work piston 5.1.

The aforementioned chamber 3 is likewise formed by a slit adapted to or matching the thickness 4.8 of the lever 4.1 which, beginning at the jacket surface of the lower housing part 2' formed as a circular-cylindrical prism, extends into this lower housing part 2' and creates the necessary clearance for an operative actuation of the lever 4.1. A sleeve 10 slipped onto the aforementioned jacket surface of the lower housing part 2' protects the interior of the chamber 3 against contamination during the use of the support device in practice. For the purpose of fixing the sleeve 10, a first end thereof is hammered onto a collar 11 on the upper housing part 2", and a second end thereof is supported on a disk detachably secured to the lower housing part 2' and protruding beyond the jacket surface of the lower housing part 2'.

Figure 4:
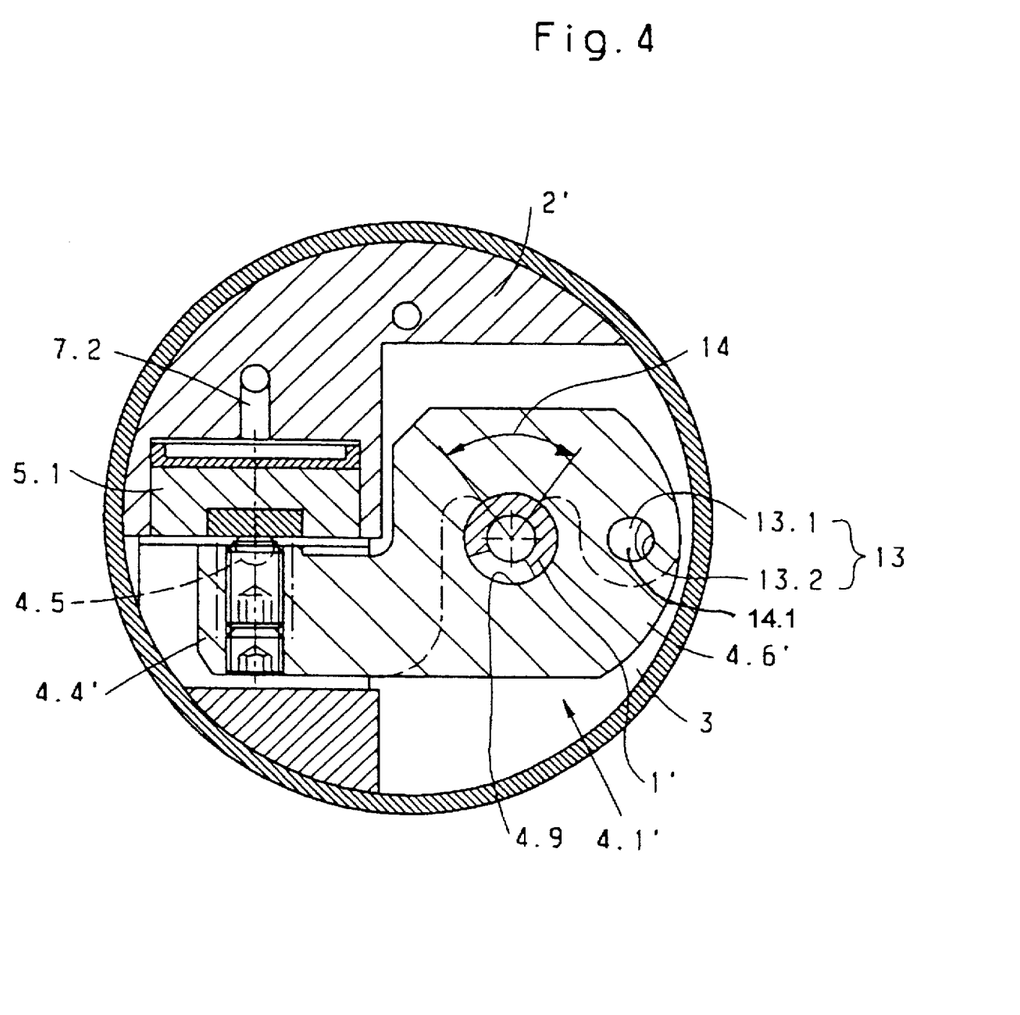
FIG. 4 is a cross-sectional view corresponding to that of FIG. 2, of another exemplary embodiment of the support device according to the invention, with a support shaft which is under the influence of a transverse force during operation.

FIG. 4 is a sectional view corresponding to that of FIG. 2 of another exemplary embodiment of the invention, wherein the support shaft 1', during operation, is under the influence of or subjected to a transverse force. This exemplary embodiment is equivalent to the embodiment described hereinbefore, except for the differences discussed hereinafter. The support shaft 1' has a circular-cylindrical cross section throughout, to which non-illustrated guide surface sections conform in a manner analogous to the guide surface sections 2.1, 2.1', 2.2, 2.2' and 2.3 of the aforedescribed embodiment. The circular-cylindrical form of the cross section is not absolutely necessary but has proved to be advantageous from a production standpoint. Between the housing 2, and especially between the lower housing part 2' and a second end portion 4.6' of the lever 4.1 opposite the first end portion 4.4' of the lever 4.1', an articulated connection 13 is provided. In this regard, in the embodiment of FIG. 4, an articulated bolt 14.1 is inserted into the lower housing part 2' parallel to the support shaft 1', and passes through an articulated bore 13.2 formed in the lever 4.1' and is adapted to or matches the cross section of the bolt 14.1.

The lever 4.1', between the first end portion 4.4' thereof and the articulated connection 13, is in engagement with the support shaft 1'. For this purpose, the lever 4.1' and the articulated connection 13 are disposed in the lower housing part 2' so that the first end portion 4.4' of the lever 4.1' is located on one side, and the articulated connection 13 on the other side of the support shaft 1', the support shaft 1' passing through a bore 4.9 formed in the lever 4.1'. With this arrangement, the adjusting force acting on the ball 4.5 during operation produces a transverse force, increased with respect to the adjusting force, at the support shaft 1', the transverse force, in turn, generating a positioning force between the support shaft 1' and correspondingly oriented regions of the surfaces of the aforementioned guide surface sections not shown in the drawing here, which in the final analysis is definitive for the attainable support force.

In the description of the exemplary embodiment heretofore, the operative connection between the support shaft 1' and the lever 4.1' is produced via the aforementioned bore 4.9. Thus, the support shaft 1', in the engagement region between it and the lever 4.1', is entirely surrounded form-lockingly by this lever 4.1'. However, such a form-locking operative connection is not absolutely necessary. Other structural developments of the engagement region are also conceivable with which in this engagement region a transverse force resulting from the adjusting force can be transmitted to the support shaft 1'. One conceivable possibility is suggested as an example in FIG. 4 by broken lines. In this regard, a support surface conforming to the cross-sectional contour of the support shaft 1' is provided on the lever 4.1', the support surface extending over only a suitably selected support region 14 of the jacket surface of the support shaft 1'.

Figure 5:
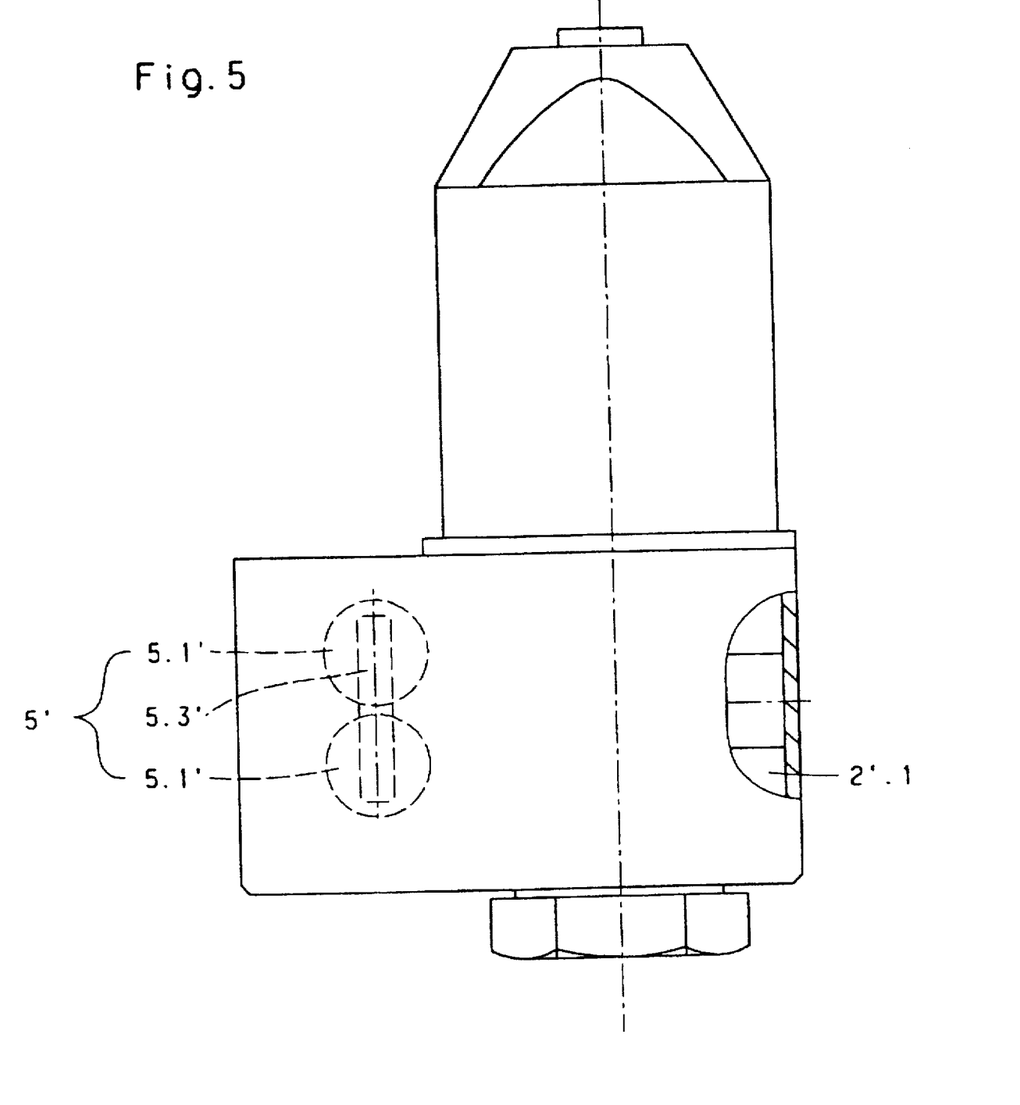
FIG. 5 is a view corresponding to that of FIG. 1, of the support device having a different embodiment of a control element arrangement thereof which, during operation, provides an adjusting force acting upon a force boosting or power ratio device thereof.

In the embodiment of FIG. 5, an ultimate control element arrangement 5' having two work pistons 5.1' disposed one above one the other in the longitudinal direction of the support shaft 1 or 1' could be provided instead of the work piston 5.1 used for the exemplary embodiments described hereinbefore. The ultimate control element arrangement 5' suggested in FIG. 5 can be used advantageously to form a lower housing part 2'.1 having a smaller diameter than that of the lower housing part 2' of the exemplary embodiments of FIGS. 1 to 4. In FIG. 5, the two work piston 5.1' have assigned thereto a common pressure plate or thrust member 5.3', by means of which the adjusting force can be transmitted to the aforementioned ball 4.5 (note FIG. 2 or FIG. 4, for example).

The aforementioned advantage can also be attained with the aid of a single non-illustrated work piston having an elongated cross-sectional area and a longitudinal extension thereof along the support shaft 1 or 1'.

Figure 6:
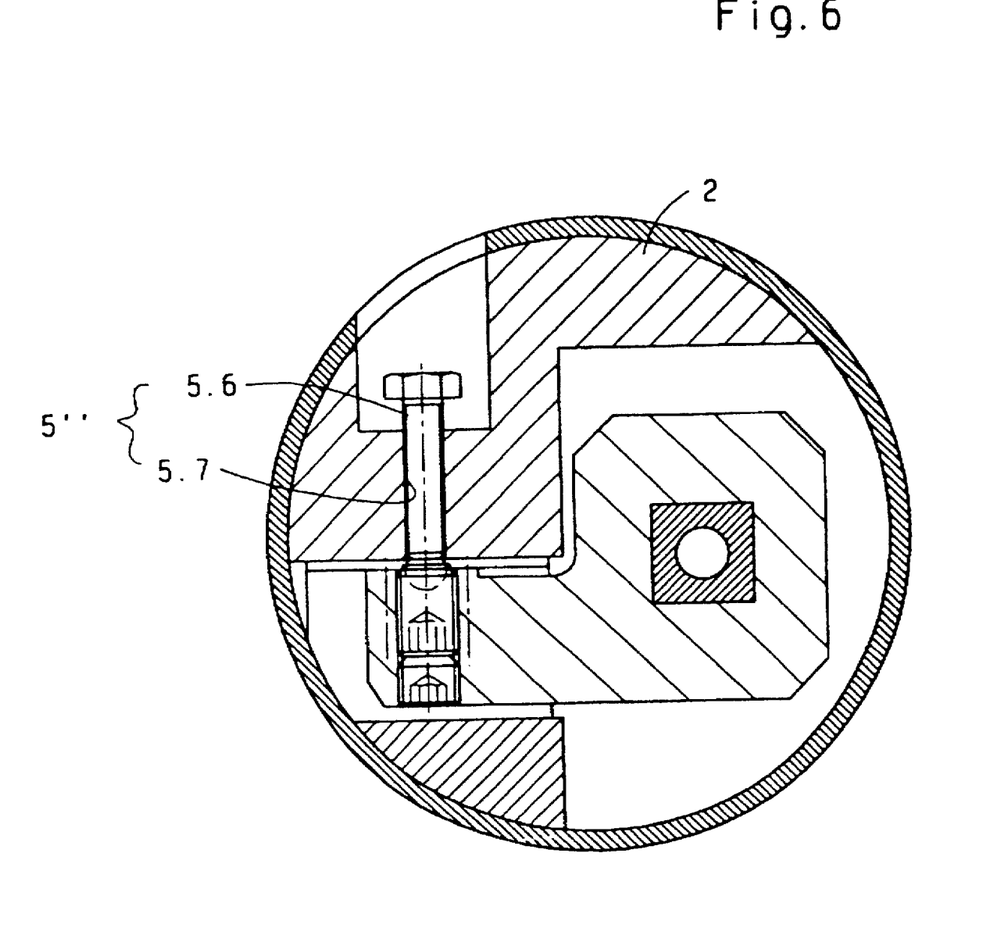
FIG. 6 is a cross-sectional view corresponding to that of FIG. 2, of the support device having another different embodiment of the control element arrangement thereof.

As shown in FIG. 6, yet another ultimate control element arrangement 5" can be provided which does not have any work pistons 5.1 or 5.1', but instead has an adjusting screw 5.6, which is received in a thread 5.7 formed in the housing 2 and is positioned during operation against the aforementioned ball 4.5.

By way of example for the embodiment of FIG. 1, wherein the support shaft 1 is shown in the starting position thereof, described hereinafter is the displacement device for the support shaft 1 provided as a further feature of the invention and integrated in the housing 2.

The support shaft 1 is formed with a central blind bore 1.3, extending from the free end of the portion 1.1 thereof located in the lower housing part 2'. Inserted into this bore 1.3 are first a positioning spring 15 and then a support pin 16 adapted to or matching the diameter of the blind bore 1.3. The support pin 16 is also inserted by the end thereof distal from the positioning spring 15 into a threaded member 17 screwed to the lower housing part 2'. The positioning spring 15, resting on the bottom of the blind bore 1.3, engages the support shaft 1 and is braced against the housing 2 via the support pin 16 and the threaded piece 17. In the illustrated starting position of the support shaft 1, the positioning spring 15 is under an initial tension or load, by means of which a longitudinal displacement of the support shaft 1 out of the starting position thereof can be accomplished, specifically, in a direction which extends from the aforementioned free end of the support shaft portion 1.1 located in the lower housing part 2' toward the opposite free end of the support shaft 1.

The aforementioned displacement device further includes a switching device 18 which, by means of a pressurized fluid can be shifted from a non-activated state into an activated state. The switching device in the exemplary embodiment includes an adjusting piston 18.1, which extends in the longitudinal direction of the support shaft 1 in the housing 2, in this case, especially, the upper housing part 2", and is penetrated by the support shaft, specifically by the second support shaft portion 1.2 which, in this embodiment, is formed with a circular-cylindrical cross section. A restoring spring 18.2 is pressed against an end face of the adjusting piston 18.1 distal from the first support shaft portion 1.1, and is braced against the housing 2, in this case, especially, the upper housing part 2". In the non-activated state shown, the restoring spring 18.2 is already under an initial tension or load, which compensates for the initial tension or load of the positioning spring 15, so that, under the initial tension of the restoring spring 18.2, the adjusting piston 18.1 contacts the aforementioned stop 18.3, which is formed by protruding corners of the quadrilateral profile of the support shaft portion 1.1, and keeps the support shaft 1 in the illustrated starting position thereof, counter to the action of the positioning spring 15.

In the activated state of the switching device 18, the adjusting piston 18.1 is acted upon unilaterally by the pressurized fluid, specifically at an end face 18.4 of the adjusting piston 18.1 distal from the restoring spring 18.2. The adjusting piston 18.1 thus presses against the restoring spring 18.2 with a pressure force acting upon the piston which is exerted by the fluid, causing simultaneous relief of the stop 18.3, and is displaced in the direction of the spring until it comes to rest, possibly or necessarily, against a shoulder 18.5 formed in the upper housing part 2". As a consequence of the aforementioned relief of the stop 18.3, the support shaft 1 is displaced out of the starting position thereof under the initial tension or load of the positioning spring 15, and towards the free end of the second support shaft portion 1.2.

For applying the pressurized fluid to the adjusting piston 18.1, a further threaded union 19, as suggested in FIG. 3, is inserted into the lower housing part 1 and can, in turn, be made to communicate with a pressure fluid source which furnishes the pressurized fluid, and to communicate at the other end thereof with communicating bores 20.1 to 20.5, one of which discharges into an annular chamber 21, formed between the adjusting piston 18.1 and the housing 2, an end face of the annular chamber being defined by the end face 18.4 of the adjusting piston 18.1.

In the exemplary embodiment under discussion, a non-illustrated common pressure fluid source is preferably provided to act upon the work piston 5.1 and the adjusting piston 18.1, and the threaded union 6 communicating with the cylinder 5.4 is preceded by a pressure-dependent control valve. Thus, a follower circuit is created, wherein the switching device 18 can be set in the activated state thereof before the chucking device 4 is acted upon by the adjusting force by means of the work piston 5.1. In practical terms, this means that the support shaft 1, assuming a suitable disposition of the support device and a suitable design, especially, of the positioning spring, initially presses with a relatively low positioning force against a workpiece mentioned at the introduction hereto, and is then maintained in the thus-assumed position with the attainable support force.

For positioning the support device in a clamping device, the sleeve-like upper housing part 2" is formed with an external thread 22, by means of which the support device can be screwed into the clamping device.

By means of a special measure, the support force attainable with any arbitrary embodiment exceeds the effective frictional force resulting from the applicable positioning force at the support shaft 1, 1'. The aforementioned special measure calls for locally deforming the support shaft 1, 1' elastically by means of the adjusting force, so that deformation energy is required for the longitudinal displacement thereof in a direction facing away from the aforementioned workpiece. In the exemplary embodiment of FIG. 1, such an elastic deformation is attained by weakening the cross section of the first support shaft portion 1.1 by means of the blind bore 1.3. The elastic deformation, in this regard, takes the form of a local twisting of the support shaft 1 under the influence of the torsional moment which engages it, the moment being generated by means of the adjusting force.

I claim:

1. Support device, comprising:
   a support shaft;
   a housing formed with guide surface sections therein which form-lockingly surround said support shaft, said support shaft being guidable rectilinearly in a longitudinal direction thereof along said guide surface sections;

a chucking device supported by said housing, said chucking device serving for converting an engageable adjusting force into a pressing force between at least one part of said guide surface sections and said support shaft, said chucking device being formed as a force-transmitting device which increases the effect of said adjusting force.

2. Support device according to claim 1, wherein said support shaft is formed with at least one longitudinally extending portion thereof having a non-circular cross-sectional profile, and said chucking device, when engaged by said adjusting force, being actionable for exerting a torsional force on said support shaft.

3. Support device according to claim 1, wherein said chucking device, when engaged by said adjusting force, is actionable for exerting a transverse force on said support shaft.

4. Support device according to claim 1, including a chamber formed in said housing and interrupting said guide surface sections, said chucking device being received in said chamber.

5. Support device according to claim 1, including a control element arrangement disposed in said housing, said chucking device being engageable by said adjusting force via said control element arrangement.

6. Support device according to claim 5, wherein said control element arrangement includes at least one working piston having a pressurized fluid acting thereon, and a cylinder integrated in said housing and guiding said working piston, said working piston, during operation, being positioned against said chucking device under the pressure of said fluid.

7. Support device according to claim 5, wherein said control element arrangement is formed as a set screw received in a thread formed in said housing and, during operation, being positioned against said chucking device.

8. Support device according to claim 1, wherein said chucking device is formed by a lever acting transversely to said support shaft, said lever having a first end part at which, during operation, said lever is acted upon by said adjusting force.

9. Support device according to claim 8, wherein said support shaft is formed with at least one longitudinally extending portion thereof having a non-circular cross-sectional profile, and wherein said lever is formed with a recess on a second end part thereof located opposite said first end part thereof, said recess being defined by a surface matching said non-circular cross-sectional profile of said support shaft and engaging said support shaft at a location of said longitudinally extending portion thereof having said non-circular cross-sectional profile.

10. Support device according to claim 8, including an articulated connection between said housing and a second end part of said lever disposed opposite said first end part thereof, said lever being in engagement with said support shaft between said first end part of said lever and said articulated connection.

11. Support device according to claim 1, including a displacement device integrated in said housing, said displacement device having a positioning spring braced against said housing and engaging said support shaft for longitudinally displacing said support shaft from a starting position thereof, and having a switching device resettable by a pressurized fluid from a non-activated state, wherein said support shaft is maintained in said starting position thereof counter to the action of said positioning spring, into an activated state, wherein a displacement of said support shaft out of said starting position thereof is enabled.

12. Support device according to claim 11, wherein said switching device comprises an adjusting piston guided in longitudinal direction of said support shaft in said housing and formed with a bore through which said support shaft extends, a stop disposed on said support shaft, said adjusting piston being positionable against said stop, and a restoring spring engaging said adjusting piston and being braced against said housing, said adjusting piston being positioned against said stop under the force of said restoring spring in said non-activated state of said switching device, said adjusting piston, when acted upon at one side thereof by said pressurized fluid, being displaceable counter to the force of said restoring spring.

* * * * *